United States Patent [19]
Gordon et al.

[11] Patent Number: 5,105,767
[45] Date of Patent: Apr. 21, 1992

[54] COMPUTERIZED MONITORING SYSTEM FOR ANIMAL FEED RATION PROCESSING MILLS

[75] Inventors: Blair M. Gordon; Ian Soutar; Don Phillips, all of London, Canada

[73] Assignee: 168189 Canada Limited, Canada

[21] Appl. No.: 360,010

[22] Filed: Jun. 1, 1989

[30] Foreign Application Priority Data

Jan. 3, 1989 [CA] Canada .................................. 587390

[51] Int. Cl.⁵ .............................................. A01K 5/02
[52] U.S. Cl. .................................. 119/57.92; 366/603
[58] Field of Search ................ 119/51.02, 51.11, 56.1, 119/57.1, 57.92, 57.6; 366/603, 181, 160, 134, 152, 140; 73/DIG. 3

[56] References Cited

U.S. PATENT DOCUMENTS

| | | | |
|---|---|---|---|
| 3,116,716 | 1/1964 | Sime | 119/52 |
| 3,557,757 | 1/1971 | Brooks | 119/51 |
| 3,822,056 | 7/1974 | Hawes, Jr. et al. | 119/57.1 X |
| 4,006,752 | 2/1977 | De Vale | 73/DIG. 3 X |
| 4,162,683 | 7/1979 | Brooks | 119/51 |
| 4,353,482 | 10/1982 | Tomlinson | 366/152 |
| 4,493,290 | 1/1985 | Gibbard | 119/51.02 |
| 4,502,416 | 3/1985 | Keysell et al. | 119/51.11 |
| 4,525,071 | 6/1985 | Horowitz et al. | 366/152 |
| 4,561,781 | 12/1985 | Seymour | 366/134 |
| 4,581,704 | 4/1986 | Mitsukawa | 366/160 |
| 4,733,971 | 3/1988 | Pratt | 366/152 |
| 4,786,182 | 11/1988 | Larsen | 366/140 |
| 4,825,707 | 5/1989 | Rosaen | 73/DIG. 3 X |
| 4,830,508 | 5/1989 | Higuchi et al. | 366/152 |
| 4,907,538 | 3/1990 | Helmle et al. | 119/57.6 |

FOREIGN PATENT DOCUMENTS

| | | | |
|---|---|---|---|
| 3321731 | 12/1984 | Fed. Rep. of Germany | 119/57.1 |
| 3602048 | 7/1986 | Fed. Rep. of Germany | 119/51.11 |
| 0843889 | 7/1981 | U.S.S.R. | 119/51.11 |
| 0938856 | 6/1982 | U.S.S.R. | 119/51.02 |
| 1083986 | 4/1984 | U.S.S.R. | 119/51.02 |
| 915659 | 1/1963 | United Kingdom | 73/DIG. 3 |
| 1191853 | 5/1970 | United Kingdom | 366/160 |
| 2115303 | 9/1983 | United Kingdom | 366/152 |
| 2190767 | 11/1987 | United Kingdom | 119/51.11 |

*Primary Examiner*—Robert P. Swiatek
*Assistant Examiner*—Todd E. Manahan
*Attorney, Agent, or Firm*—Price, Heneveld, Cooper, DeWitt & Litton

[57] ABSTRACT

A computerized monitoring system for animal feed ration processing mills equipped with proportioners including a console having a keypad and liquid crystal display screen, a processor board and a circuit board for monitoring proportioner flow rates. The system assists an operator in preparing precisely tailored animal feed rations by computing proportioner dial settings for a given ration, computing the analysis of a ration for % protein, % calcium, % phosphorous and % moisture, and tracking usage inventories of ration ingredients. Ration formulas may be interactively fine tuned by adjusting proportioner throughputs during ration preparation.

14 Claims, 9 Drawing Sheets

KEYBOARD CONFIGURATION

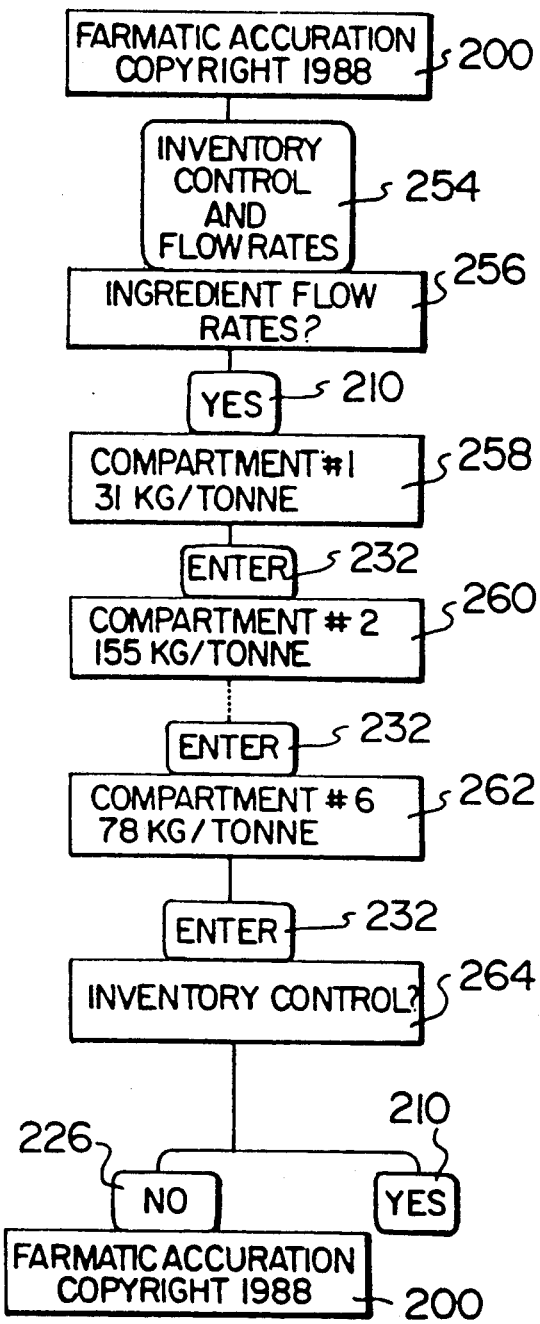
FIG.12
AS FED PROTEIN = 15.8%
90% DRY PROTEIN = 16.2%
FIG.14
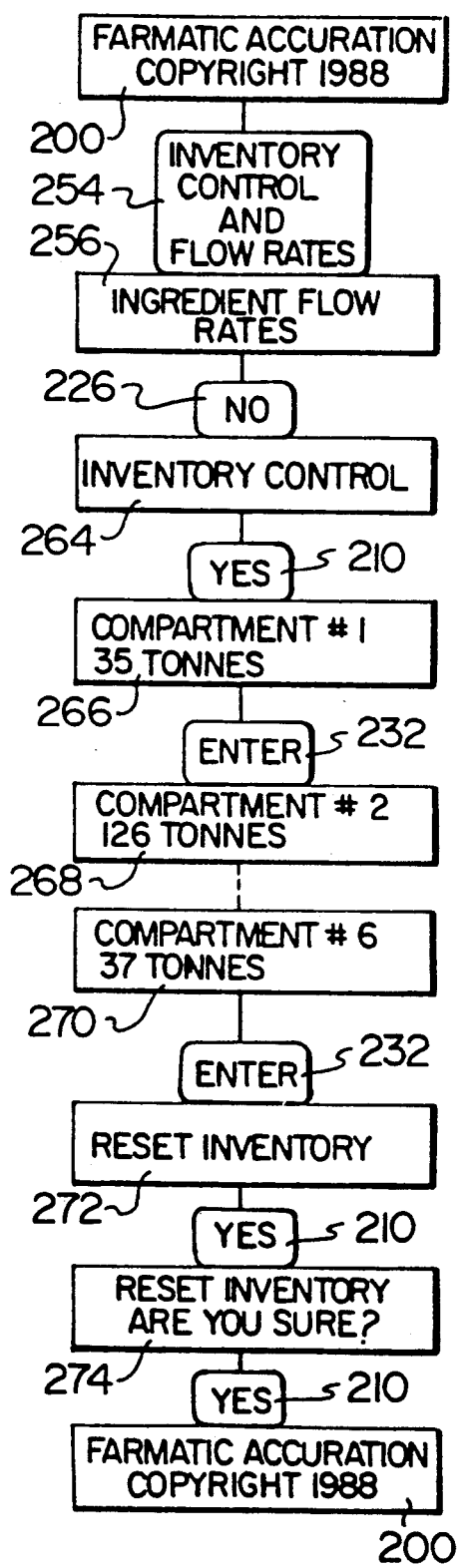
FIG.13

COMPUTERIZED MONITORING SYSTEM FOR ANIMAL FEED RATION PROCESSING MILLS

The present invention relates to mills used in the preparation of animal feed rations and, in particularly, to a computerized monitoring system for such mills to assist an operator in producing a precisely tailored animal feed ration.

BACKGROUND OF THE INVENTION

Mills for processing animal feed rations are commonly available in two types, roller mills and hammer mills. Roller mills are generally used for processing feed rations for bovine animals and horses, which are sensitive to dust and fines in their ration. Roller mills process animal feed grains by crushing the grains between two or more opposing rollers. Hammer mills are generally used for the preparation of chicken and swine feed rations since these animals digest finely ground rations more readily and they are less sensitive to dust and fines in their rations. Hammer mills process animal feed grains by grinding with a plurality of centrifugal flails or hammers.

Both types of animal feed ration processing mills have been in use for many years. Traditionally, the ingredients of animal feed rations were ground or rolled sequentially and conveyed or blown into a mixing apparatus where they were mixed with supplements or other prepared ration ingredients. The disadvantage of this traditional method is that considerable time and energy are consumed in producing a properly mixed ration.

In order to improve the efficiency of animal feed ration preparation, automated apparatus were invented to deliver several ration ingredients simultaneously in proportioned amounts to the input orifice of feed ration processing mills. These apparatus are commonly called proportioners and they are also well known in the art.

Proportioners permit ration mixing within a processing mill, eliminating the need for an auxiliary mixer. Since proportioners feed ration ingredients simultaneously into a mill, each in its correct proportion, mixing is accomplished during the required processing of the ration ingredients.

Although proportioner attachments for ration processing mills have proven to be a significant advance over the traditional milling and mixing method, the determination of accurate proportioner control settings for producing a tailored ration is a difficult and time consuming task. Proportioner control settings are preferably calculated using ration ingredient analyses and ration composition formulas obtainable from agricultural research facilities. Manually calculated proportioner control settings may be accurate but are difficult to verify. Although a processed ration may be sent to a laboratory for a verification analysis, repeated analyses may be required to achieve a desired ration.

With the ever increasing competition in farm products and the resulting thinner margins in farm profits, farmers have found it necessary to operate their animal feed programs with a maximum of achievable efficiency. Since animal feed accounts for approximately 80% of a producers total variable cost, it is essential that feed rations be tailored as closely as possible to their most efficient composition. It is well known that feeding extra protein, for instance, while increasing the cost of a ration provides no benefit to the animals fed. On the other hand, feeding too little protein may create both health and weight gain problems in animals. Variations of as little as 1% in the protein content of animal feed rations can be critical and can account for significant savings or losses for a producer over an extended period of time.

There therefore exists a need for a computerized monitoring system for proportioner equipped animal ration processing mills to assist producers in achieving improved efficiency in their animal feeding programs.

French patent application 792,342 describes a roller type mill having two overhead compartments for delivering ration ingredients to the mill's rollers. Each compartment is emptied independently into a paddle wheel shaped weight estimating apparatus which is monitored by an electrical or mechanical comparator for tracking the approximate weight of the ingredient processed from a compartment. When a given weight is processed from one compartment, that compartment is closed and the other compartment is opened to process a second ration ingredient in the same manner. These steps are repeated until each ingredient of a ration has been processed. As this apparatus does not supply ration ingredients simultaneously, an auxiliary mixer is required to produce a mixed ration. The apparatus does not track inventories, measure ingredients with precise accuracy, or provide an analysis for a processed ration.

SUMMARY OF THE INVENTION

It is an object of the present invention to provide a computerized monitoring system for an animal ration processing mill provided with a proportional input attachment having individually controllable ingredient throughputs.

It is a further object of the invention to provide a computerized monitoring system for such mills which is capable of calibrating a proportioner, tracking ration ingredient usage, computing flow control dial settings for a proportioner, and computing analysis statistics for the % protein, % calcium, % phosphorous and % moisture of a ration being processed.

The present invention represents an advance in the art of animal feed ration processing mills which are equipped with proportional input control attachments.

Proportional input control attachments, commonly called proportioner attachments for animal ration processing mills, as stated above, are well known in the art. One well known embodiment of a proportioner attachment has a multichambered hopper which communicates with a mill's input orifice, each chamber being provided with a variable speed auger for the controlled input of ration ingredients to the mill, permitting the simultaneous proportional input of several ration ingredients. The invention monitors the flow through proportioner augers using data obtained by calibrating the flow by weight through each auger at a given flow control setting. Once calibrated, a count of every half-revolution of each auger yields an accurate assessment of the weight of each ration ingredient input to the processing mill. Ration ingredients analysis data, including % protein, % calcium, % phosphorous and % moisture is stored in EEPROM (Electrically, Erasable, Programmable Read Only Memory) for each ration ingredient. This data is manipulated in conjunction with ingredient flow data, monitored as described above, to provide an interactive online analysis of a ration being processed. Since most animal research is generally conducted under controlled conditions using 90% dry feed, all analyses are displayed on an "as fed" as well as a "90% dry" basis, providing a straightforward comparison of the analysis of a ration with a recommended analysis obtained from an agricultural research facility.

The invention also assists a mill operator in preparing an animal feed ration which is precisely tailored to exacting specifications by providing proportioner control settings, ration analysis, and ingredient usage data, any one of which may be displayed by the operator as required.

The invention includes a console which is equipped with a dedicated microprocessor, a video display, and a keypad. The microprocessor is connected to throughput monitors provided for each proportioner flow path. The throughput of each proportioner flow path is constantly monitored while a mill, equipped in accordance with the invention, is operating. Proportioner throughput is used in conjunction with ration ingredient analyses stored in computer memory to compute the composite analysis of a feed ration in an online process. A ration formula may be fine tuned interactively by adjusting proportioner throughputs during ration preparation.

In more general terms, the present invention comprises a computerized monitoring system for an animal feed ration processing mill having at least two independently regulatable supply paths for supplying ration ingredients simultaneously and in proportioned amounts, the system comprising:

means for monitoring the flow through each supply path;

computing means provided with a control program for accumulating data from the monitoring means, calibrating the flow through the input paths, computing control settings for the inputs paths given a ration formula and maintaining inventories of ration ingredient usage;

key pad means for inputting commands or data to the computing means; and means for visually displaying data accumlated or calculated by the computing means.

BRIEF DESCRIPTION OF THE DRAWINGS

The present invention will now be explained by way of example only and with reference to the accompanying drawings wherein:

FIG. 12 is a progress diagram of the LCD displays and keypad selections for obtaining inventory information using the console of FIG. 2;

FIG. 13 is a process diagram illustrating the LCD displays and keypad selections for resetting inventory values using the console of FIG. 2; and FIG. 14 is a diagram of the LCD display of the estimated protein content of an animal feed ration being produced with a processing mill equipped in accordance with the invention.

DETAILED DESCRIPTION OF THE PREFERRED EMBODIMENT

Figure 1:
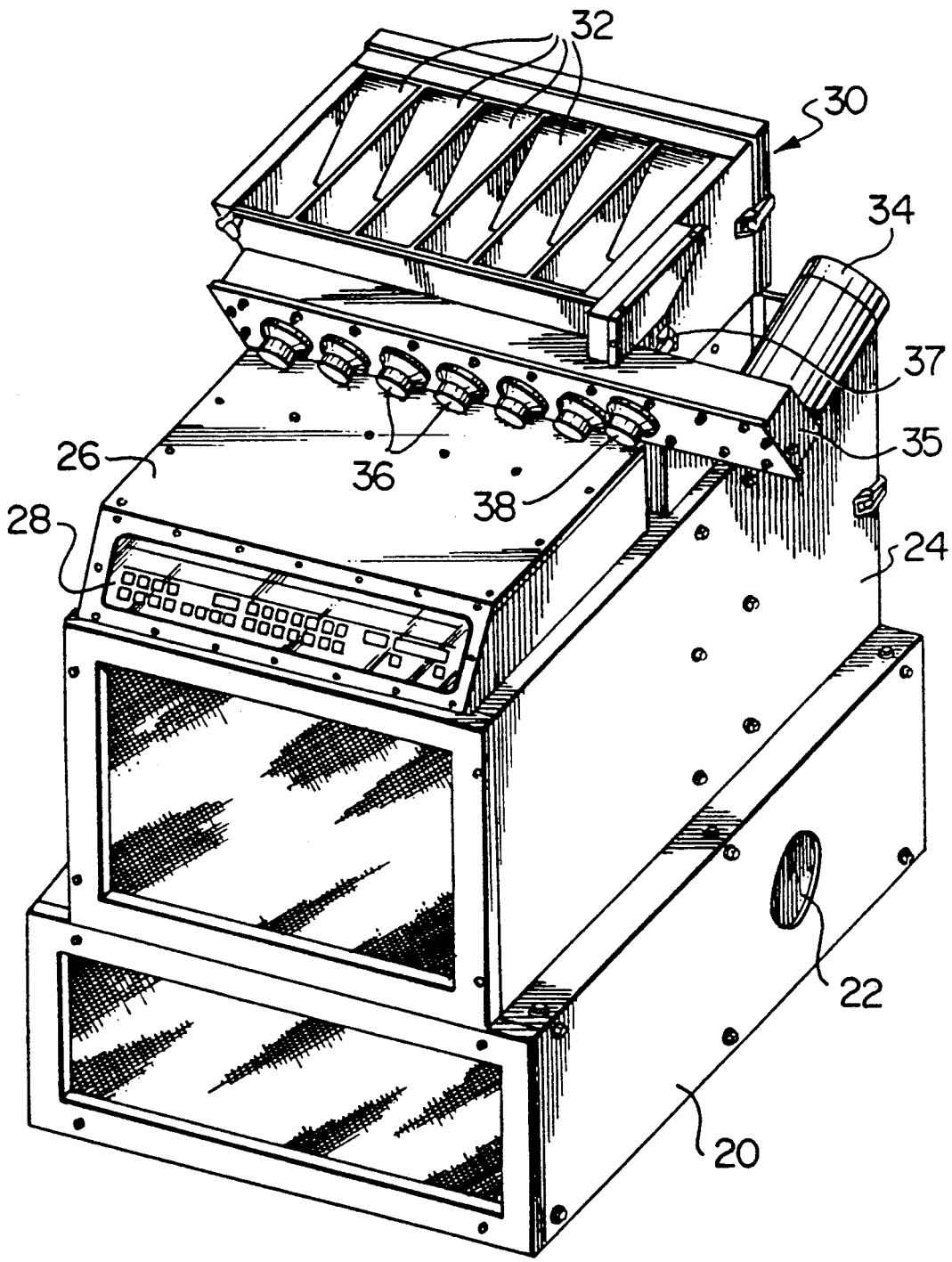
FIG. 1 is a perspective view of an animal ration processing mill equipped with a proportioner attachment.

An animal ration processing mill equipped with a proportioner apparatus of a type well known in the art is illustrated in FIG. 1. This particular mill includes a base unit 20 where processed ration accumulates and is blown or conveyed away through an outlet port 22. The mill housing unit 24 encloses a power source, generally a powerful electric motor, and the milling apparatus which may be either a roller or hammer mill. Attached to the top of the mill housing unit is a mill control panel box 26 which houses the electrical circuitry for controlling and monitoring the operation of the mill. A control panel 28 is affixed to the front of the control panel box. The control panel 28 is a touch sensitive, integrated surface having individually selectable control functions and mill status indicators. As already noted, mills of this type are well known in the art and will not be described in detail.

Located immediately to the rear of the control panel box is a proportioner attachment generally indicated by the reference 30. The proportioner includes six separate ration ingredient input compartments 32. Each compartment provides an individually controllable ration ingredient flow path. Normally, a ration ingredient delivery pipe (not illustrated for clarity) is attached to the top of each proportioner compartment. These delivery pipes interconnect ration ingredient storage bins (not illustrated) with the proportioner compartments 32. Located in the bottom of each proportioner compartment 32 is a variable speed proportioner auger 33 (see FIG. 4c) which controls its throughput. The variable speed proportioner augers are powered by an electric motor 34. The turning speed of each auger is controlled by a flow selector dial 36. A master speed control 38, located on the right hand side of the proportioner control panel, regulates the overall delivery speed of the proportioner. Because some rations contain ingredients which are easily processed, while other rations contain ingredients which require more processing energy, a master speed control is required for regulating the throughput of the proportioner to the capacity of the mill motor. Although the preferred embodiment of the present invention has been specifically designed to operate integrally with a proportioner of the type illustrated in FIG. 1, it is equally adaptable to other styles of proportioners having a different type of flow control apparatus.

Figure 2:
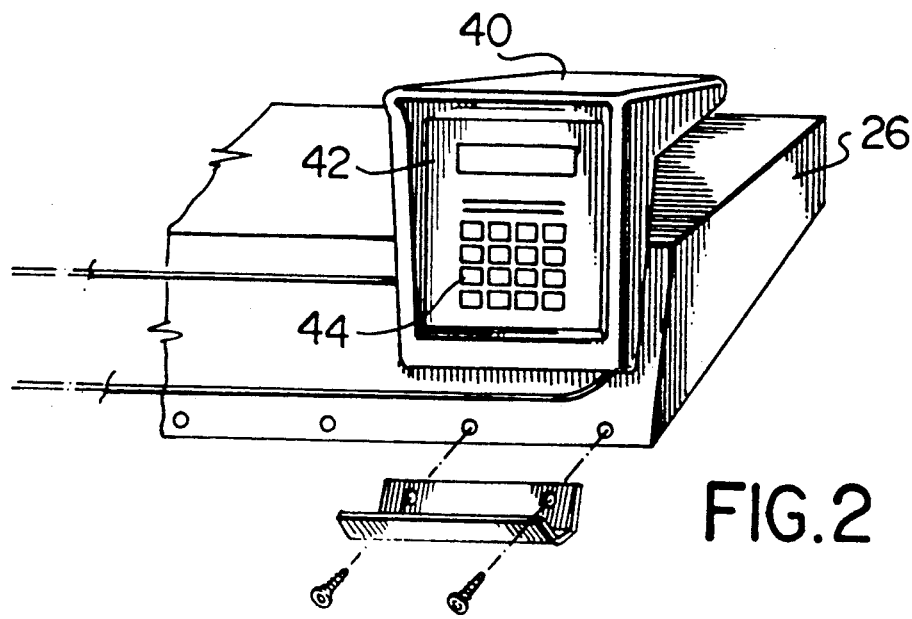
FIG. 2 illustrates a preferred embodiment of a computer console in accordance with the invention, illustrating the attachment of the console to the control panel box of the mill shown in FIG. 1.

FIG. 2 illustrates a console 40 in accordance with the invention. The console 40 is adapted to fit the contour of the front and top of the control panel box 26 of the mill illustrated if FIG. 1. The console includes a video display 42, preferably a super twist LCD (liquid crystal display), and a keypad 44. The LCD display 42 is preferably a liquid crystal display known in the art which has two display lines of twenty characters each. The keypad 44 is a 16 key (4×4 matrix), touch sensitive sealed pad of a type known in the art which has been adapted to the dedicated functions of the invention.

Figure 3:
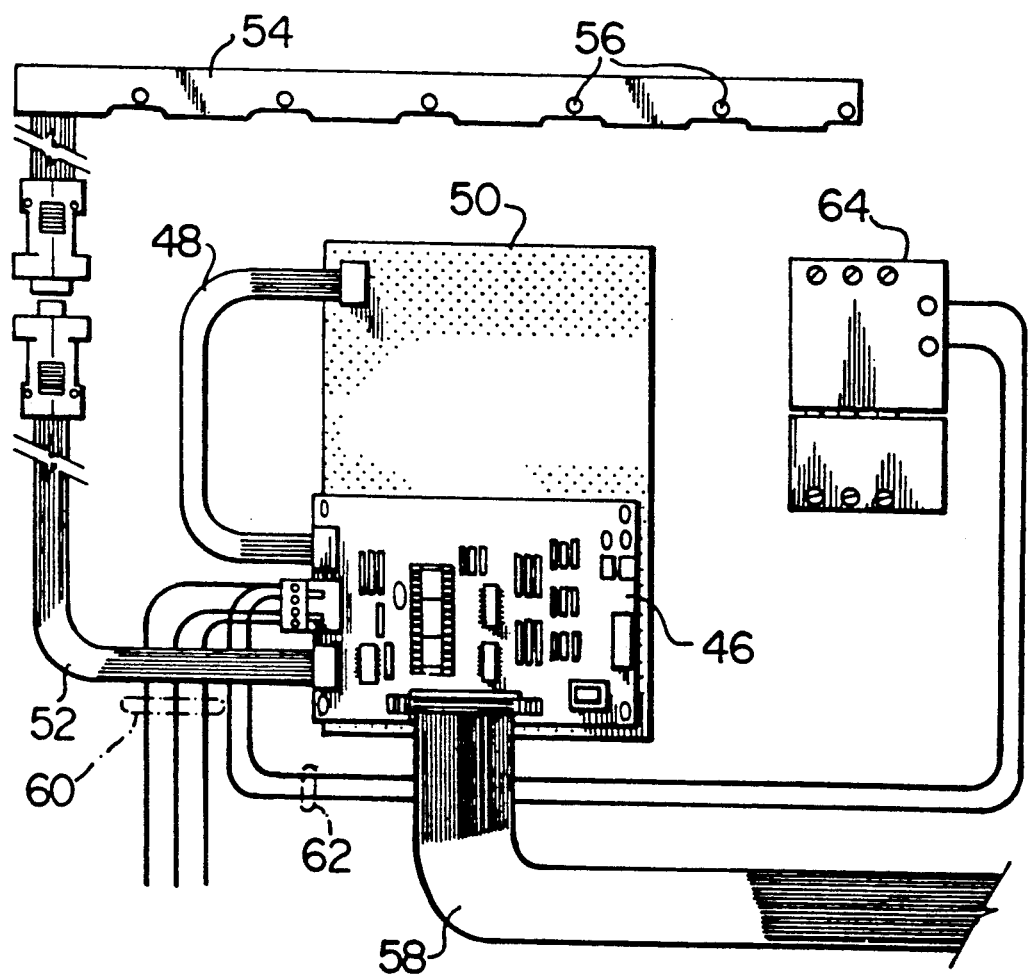
FIG. 3 is a schematic diagram of the arrangement of the electronic components of the invention.

FIG. 3 is a schematic overview of the electrical components of the invention. Each operation of the invention is controlled by a processor board 46 which will be described in detail in reference to FIG. 5. The processor board is supplied with operating current by a power strap 48 which is connected to a power converter (not illustrated) preferably incorporated into the mill's electrical circuit control board 50. The processor board 46 is also connected by a sensor strap 52 to a sensor board 54 which is attached to a mill's proportioner attachment, transversely to the ends of the proportioner auger shafts. The structure, function and attachment of the sensor board 54 will be described below in reference to FIG. 4. The processor board 46 is also provided with a display strap 58 which connects to the console 40 (see FIG. 2) and provides a relay path for video display and keypad signals to and from the console. A telecommunications port is also provided on the processor board. The telecommunications port includes a send, receive and ground lines 60 which may be connected to the RS232 port of an independent microcomputer. The communications port on the processor board 46 is also interconnected with the mill motor contactor 64 by ground and signal lines 62. This connection permits the microprocessor chip on the processor board to monitor the operation of the mill motor.

Figure 4A:
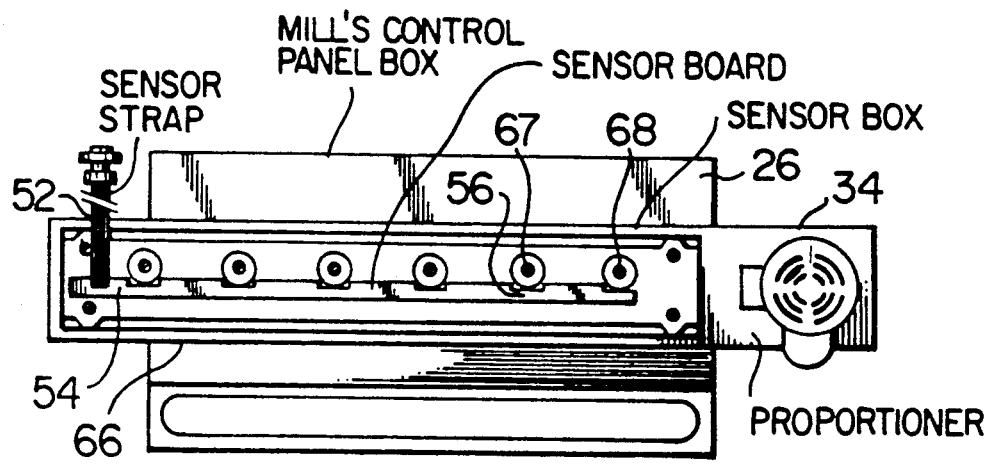
FIG. 4, consisting of FIGS. 4a–4c, illustrate the proportioner auger monitoring apparatus for monitoring the throughput of each proportioner auger and the attachment of the monitoring apparatus a proportioner.
Figure 4B:
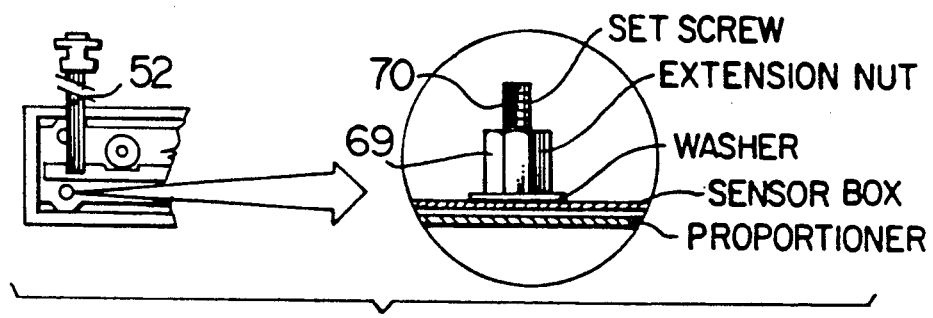
Figure 4C:
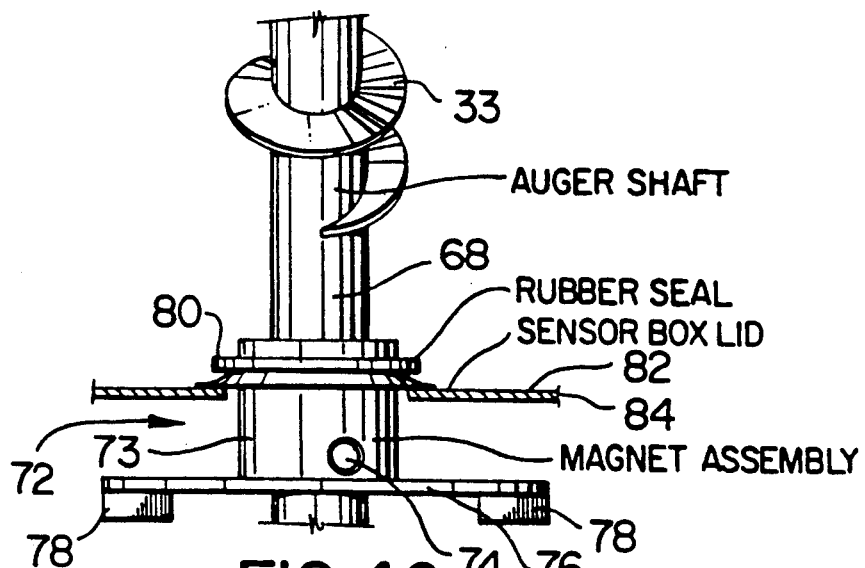

FIGS. 4a-4c illustrate the process of upgrading the mill shown in FIG. 1 with a sensor board 54 for monitoring the revolutions of each of the proportioner augers. The proportioner power unit 35 (see FIG. 1) is connected to the proportioner compartment housing 30 by means of a pair of latches 37 (see FIG. 1). Proportioner power unit 35 is removed from the proportioner in order to upgrade a proportioner with a sensor board 54. The sensor board 54 is housed in a "sensor box" 66 which is attached to the rear of the proportioner power unit 35. The sensor box 66 is a shallow rectangular steel box having a removable cover. Circular bores 67 pierce both the bottom of the sensor box and its cover to accommodate the ends of the proportioner auger shafts. The sensor board 54 is a narrow elongated circuit board adhesively affixed to the bottom of the sensor box 66 (see FIG. 4a). The sensor board circuit incorporates six Hall Effect sensors 56, one sensor being located under the end of each auger shaft. The sensor box 66 is attached to the rear of the proportioner power unit by using four extension nuts 69 and four set screws 70 (FIG. 4b) for lengthening the proportioner power unit mounting studs enough to extend through the top of the sensor box. When the sensor box 66 is attached to the proportioner as described, a magnet assembly, generally referred to by reference 72 (FIG. 4c), is attached to the end of each auger shaft 68. Each magnet assembly 72 is formed from a hollow cylinder 73 having a longitudinal bore sized to accommodate an auger shaft. Welded to one end of each cylinder 73 is a rectangular steel plate 76 having a magnet 78 affixed each of its ends. The bore through cylinder 73 also pierces steel plate 76. A set screw 74 firmly attaches each magnet assembly 72 to an auger shaft 68. A rubber seal 80 slipped over the rear end of cylinder 73 prevents the leakage of ration ingredients through the required clearance space between the outer periphery of cylinders 73 and the holes 82 in the sensor box 84. The magnet assemblies 72 are attached to the auger shafts 68 so that the magnets 78 pass above each respective Hall Effect sensor with a clearance of approximately 1/32 of an inch. The functioning of Hall Effect sensors will be described in detail hereinafter.

Although the present invention has been adapted to employ the proportioner monitoring system described above, it may be adapted to employ other types of proportioner monitoring systems. For instance, deflector plates or graduated slide type flow controllers could be equipped with rheostat monitors in place of the proportioner augers described above. Any proportional delivery system for ration ingredients which may be electronically monitored to obtain a relatively accurate assessment of the throughput of each ration ingredient is suitable for use with the invention.

Figure 5:
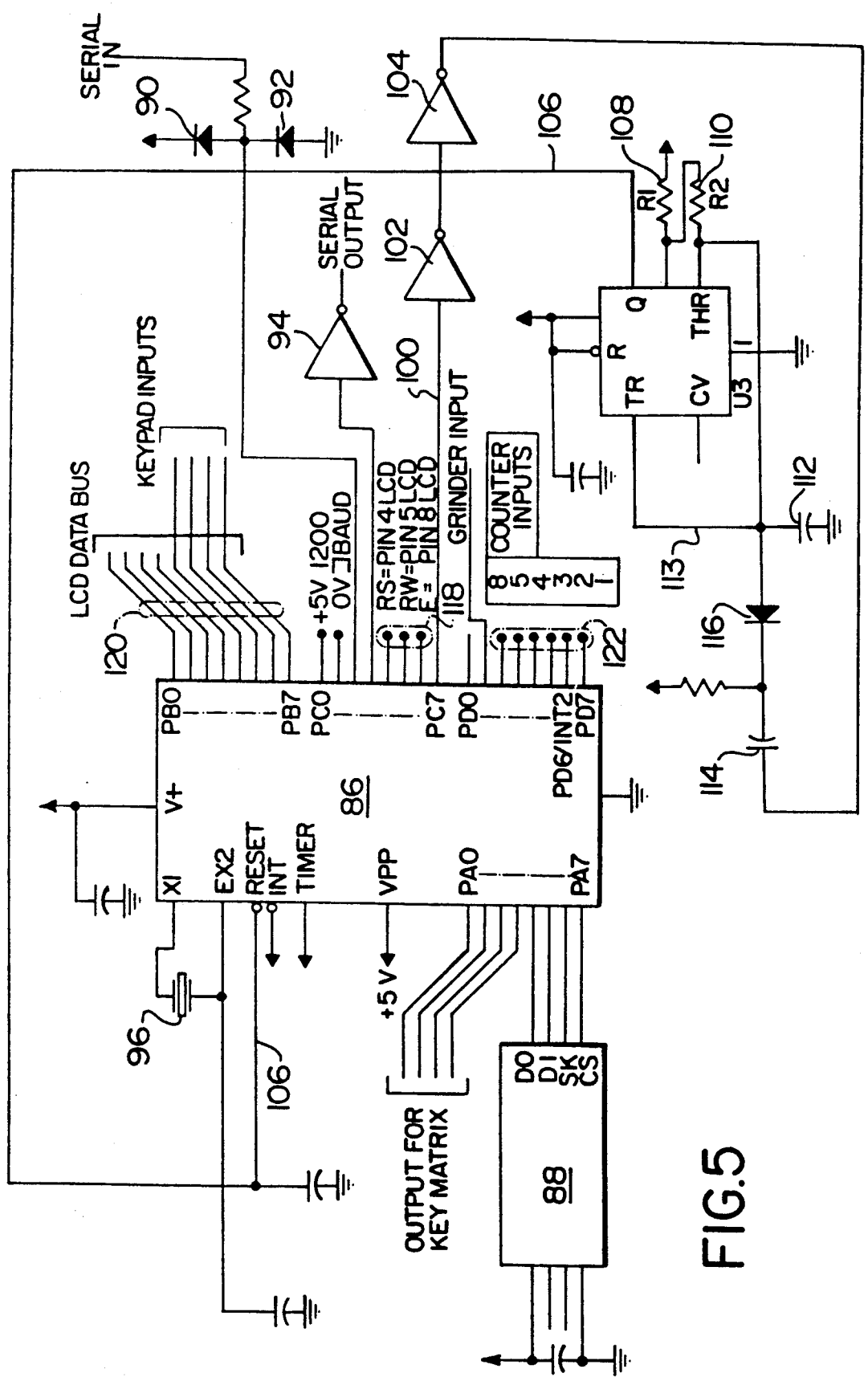
FIG. 5 is a schematic diagram of the circuitry of the microprocessor board of the invention.

As shown in FIG. 5, the processor board is built around a single chip microprocessor 86. The preferred embodiment of the invention employs a 68705-U3 microprocessor currently manufactured by the Motorolla* corporation. It will be appreciated by those skilled in the art that a number of alternate commercially available microprocessors are equally adaptable to serve as a central processing unit for the purposes of the invention. The 68705-U3 microprocessor has approximately four kilobites of programmable memory which may be erased with ultraviolet light. The programmable memory of the microprocessor is used for storing the control program of the invention, a copy of which is appended hereto. The microprocessor also has 120 bites of random access memory used for the temporary storage of data required in the performance of the various functions of the invention. The microprocessor includes thirty-two input or output pins for communication with a liquid crystal display screen, a keyboard, a sensor board, etc. The thirty two port pins are divided into four eight bit ports called Port A, Port B, Port C and Port D. For simplicity, the pins are hereinafter identified by port and pin number. For instance the first pin of Port A is labeled PA0 and the eighth pin of Port B is labeled PB7.

Figure 7:
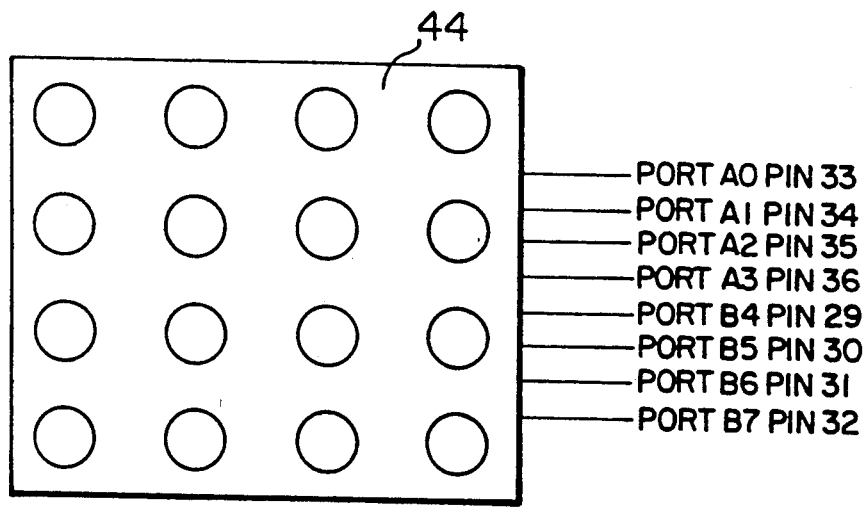
FIG. 7 is a schematic diagram of a keypad wiring scheme in accordance with the invention.

The keypad, schematically illustrated in FIG. 7, is a 4×4 matrix design which is commercially available. The keypad has four input lines and four output lines. The four input lines are connected to pins PA0-PA3 of the microprocessor 86, and the four output lines are connected to pins PB4-PB7. Microprocessor cycle interrupts occur two hundred times per second. Every twenty interrupts, or ten times per second, the microprocessor executes a control program instruction sequence to check the keypad pins for signals. During the execution of this instruction sequence, the microprocessor alternately toggles each of the four output pins PB4-PB7 from five volts to zero volts. The input pins, PA0-PA3 are simultaneously monitored. The intersection of the key matrix input pin signals with the output pin signals provides the indication of which key is depressed.

An electrically erasable programmable read only memory chip 88 (NMC 9346 EEPROM) is used for storing nutrient ingredient analysis and inventory data.

The EEPROM chip has the capability of storing information and retaining it through a power loss for up to 10 years. The chip stores a maximum of 128 bites of data. Communication between the chip and the CPU is performed using pins PA4–PA7 and is handled through a special serial communication format which is unique to the chip. This particular chip was selected for its advantage of requiring only four interface pins for its operation. Most EEPROM chips require a minimum of a twenty pin interface.

The microprocessor 86 is also provided with telecommunications capacity. The microprocessor can be connected to an RS232 port of an independent computer to permit the transfer of data from the microprocessor 86 to the independent computer where the data may be further manipulated or processed.

Port pin PC2 receives the RS232 communication from a host computer. Two diodes 90 and 92 are employed for clipping the external −12 to +12 voltage of the RS232 signal to the 0 to +5 voltage range expected by microprocessor 86. The port pin PC3 sends RS232 communications to a host computer. A 1488 power chip 94 outputs the proper voltage (+12 and −12 volts) for true RS232 standard communications. A control program instruction sequence written expressly for this application permits a communication speed of 1200 baud (bits per second). All RS232 communication is handled by microprocessor 86 using instruction sequences encoded within the control program. The RS232 communications are therefore handled without the use of a UART (Universal Asynchronous Receive Transmitter Chip). This simplifies and economizes the design of the processor board. A 3.579 megahertz quartz crystal 96 is used as a timing standard by the control program for timing and controlling RS232 communications. This particular quartz crystal was chosen because it is used in the manufacture of coloured television sets and is therefore very widely available and inexpensive.

Figure 6:
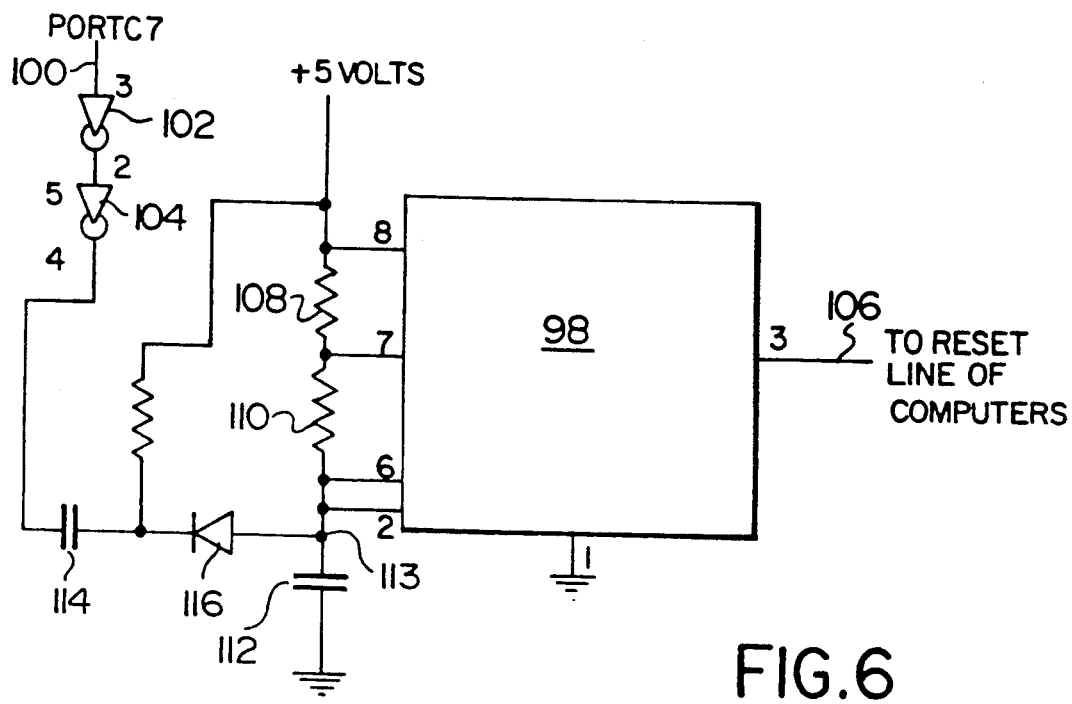
FIG. 6 is a detail of the watchdog timer circuit of the board shown in FIG. 5.

The processor board is also provided with a watchdog timer circuit which is located in the lower right hand corner of FIG. 5. The watchdog timer circuit is also illustrated schematically in more detail in FIG. 6. In reference to FIG. 6, the watchdog timer circuit is constructed around an NE555 timer chip 98. The function of the watchdog timer circuit is to reboot the microprocessor should the microprocessor "crash" as a result of power supply noise, power interruption or some other interference problem. The 555 timer chip is an industry standard chip which has been available for many years. It is widely used for electronic applications where timing is required.

Line 100 interconnects pin PC7 of the microprocessor 86 and a pair of power inverters 102 and 104 respectively. The inverters 102 and 104 are employed for increasing the current output from the microprocessor pin PC7. The output of the timer chip is connected to the reset pin of the microprocessor 86 by line 106.

In operation the microprocessor 86, in addition to performing its functions related to monitoring the processing mill, the proportioner, the keypad and computing and displaying information on the LCD as required, is responsible for constantly toggling line 100. If the microprocessor "crashes" for any reason, the regular toggling voltage on line 100 will not be generated and the 555 chip will drive line 106 low. Whenever the reset pin on microprocessor 86 is driven low, the microprocessor begins its reboot instruction sequence. Assuming that the microprocessor has failed due to electrical interference or a power interruption, the low voltage on line 106 will initiate a successful reboot of the microprocessor and it will recommence normal operation. Two 100K ohm resistors, 108 and 110 respectively and a 10 microfarad capacitor 112 have been selected to establish a timing period of approximately 2 seconds. If the microprocessor 86 fails to toggle line 100 within the selected 2 second delay, line 106 is driven low to initiate a reboot of the microprocessor. The 2 second time limit is arbitrary and may be altered by substituting components 108, 110 and 112 with other similar components having different capacities. The watchdog timer circuit also serves to boot the microprocessor 86 on power up of the processing mill. The 2 second time delay provided by the watchdog timer circuit provides time for the power supply to stabilize before the computer boots, thus reducing startup failure due to interference generated by the power supply when it is first energized.

The watchdog timer circuit functions in the following fashion. The microprocessor 86 sends current signals by pin PC7 through line 100 to inverters 102 and 104 which step up the voltage of the current. A capacitor 114 accumulates the current flow from line 100. Meanwhile current supplied through resistors 108 and 110 flows slowly to capacitor 112. Capacitor 112 has ten times the capacitance of capacitor 114, so capacitor 114 discharges more frequently. The frequent discharge of capacitor 114 opens the diode 116 to bleed off the accumulated charge of capacitor 112. If the microprocessor 86 fails to send regular signals via pin PC7 over line 100, the diode 116 stops opening a path for releasing the current accumulating on capacitor 112. Within two seconds, the resistors 108 and 110 permit enough current to flow to capacitor 112 to attain its discharge capacity. The discharged current of capacitor 112 triggers the 555 timer chip to drive line 106 low, initiating a reboot of the microprocessor.

The two line, 20 character per line, LCD (liquid crystal display) 42, discussed briefly in relation to FIG. 3, is controlled by three microprocessor port pins 118, PC4, PC5 and PC6. The databus for the LCD is connected by lines 120 to port pins PB0–PB7. The LCD selected for the preferred embodiment of the invention is a Hitachi* LMO32L supertwist LCD which is capable of displaying two lines of 20 characters each. This LCD is simple to use since it is provided with an internal ROM (read only memory) screen handling instruction set. Special codes sent through ports PC4–PC6 are available for clearing the screen and scrolling the characters. ASCII code characters placed on the LCD databus (pins PB0–PB7) are automatically displayed on the LCD by its ROM routines.

Lines 122 (FIG. 5) interconnect ports PD2–PD7 and the sensor board 54 (FIG. 4a) attached to the mill's proportioner. Lines 122 are therefore used in monitoring the flowthrough of the proportioner compartments. Each line 122 is provided with a 10K ohm "pull up" resistor (not illustrated) which goes to +5 volts. Lines 122 are connected to sensor board 54 by a sensor strap 52 (see FIG. 4a). The revolutions of each proportioner auger are monitored in the following fashion. The pull up resistors on lines 122 have the effect of driving the lines 122 high. It is well known that when a magnet is passed closely over a Hall Effect sensor, the sensor turns to ground and drives a line 122 low. Therefore, each time a magnet 78 (see FIG. 4c) passes over one of the Hall Effect sensors 56 (see FIG. 4a), a line 122 is driven low. As is apparent from FIGS. 4a-4c, a line 122 is driven low each half revolution of each proportioner auger. The six port pins PD2-PD7 are read simultaneously into one bite of microprocessor RAM (random access memory). Each of the first six bits of this bite correspond to the state of the respective lines 122. A bit set to 1 (high line) indicates that no count has come in on that line. A bit set to 0 (low line) indicates that a magnet has passed over the Hall Effect sensor connected to that line. The contents of ports PD2-PD7 are read two hundred times a second, i.e. at each microprocessor interrupt. By comparing the current reading with the last previous reading, it is easily determined which augers have completed another half revolution. The calculation is made using the following algorithm:

Previous reading (P): 1 1 1 0 1 1 1 1
Current reading (C): 1 1 0 1 0 1 1 1

By performing an exclusive OR of the previous and current states, the bits which have changed are derived.

(P) XOR (C): 0 0 1 1 1 0 0 0
(P) XOR (C): 0 0 1 1 1 0 0 0

However, since only those lines which have changed from 1 to 0 must be isolated, not those which were changed from 0 to 1 by the pull up resistors, the XOR value derived above is "anded" with (P).

[(P)XOR(C)] and (P): 0 0 1 0 1 0 0 0

As will be appreciated by those skilled in the art, the bits containing a 1 in the result of this final Boolean manipulation indicate those proportioner augers which have triggered Hall Effect sensors since the last reading was performed. The algorithm described above is executed by the microprocessor 86 in only fifteen microseconds. This is possible because each bit from the counter buffers is read simultaneously and because of the efficiency of the algorithm, allowing the microprocessor 86 to monitor each proportioner auger 200 times a second and still have abundant time remaining for other tasks.

Figure 8:
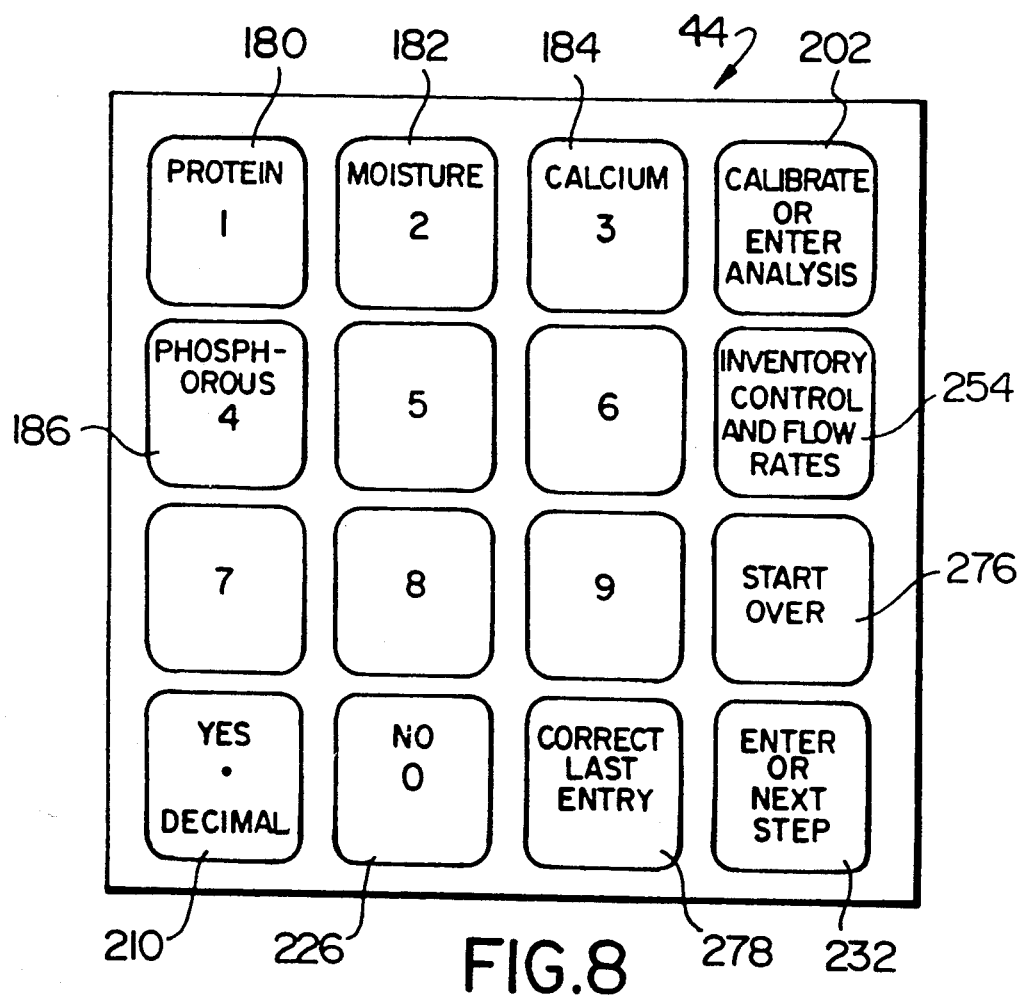
FIG. 8 shows a detailed keypad layout in accordance with the invention.

FIG. 8 shows the keypad 44 as it actually appears on the console 40 (see FIG. 2). As is apparent, there are sixteen keys on the keypad arranged in a 4×4 matrix. The function of each key is established by the control program resident in the programmable memory of microprocessor 86. The function of each key is printed on the keypad to facilitate the operation of the console. As will be noted from an inspection of FIG. 8, several keys serve two different functions. The interpretation of a key stroke is determined by the control program and, depends on the program's activity at the time that a key is pressed. For instance, if analysis or calibration data is being entered, keys 1 through 0 serve as number inputs. On the other hand, if the control program is not involved in receiving data, then keys 1 through 4 serve as prompts for the microprocessor to commence the protein, calcium, phosphorus, or moisture content calculation instruction sequences. Other keys respectively perform the functions indicated. Each function of the keypad will be described below in relation to the use of the invention.

FIGS. 9 through 12 are process diagrams which illustrate the use of the invention for producing and monitoring the production of animal feed rations. The elongated rectangles represent instructions visually displayed on the LCD screen 42 (FIG. 2), and the round cornered squares represent key selections from the keypad 44, (FIGS. 2 and 8).

In order to compute the analysis of a ration, microprocessor 86 must be provided with the analysis of each ration ingredient. The ingredients of an animal feed ration may be selected from a variety of cereal grains, oil seeds and supplements. The ingredients selected for a given ration depends partially on the type of livestock to be fed and partially on the price and availability of grains and other components suitable for a ration. Common ration ingredients include corn, barley, oats, wheat, soyabeans, soyabean meal, mineral supplements, bone meal, brewer's waste, oil seed meal, and numerous other nutritious substances. Generally, six ration ingredients are adequate for the production of all the rations required by a producer.

The accuracy of a ration analysis provided by microprocessor 86 is dependent on the accuracy of the analysis supplied to the microprocessor for each ingredient. The analysis of ration ingredients is preferably determined by having each ingredient analyzed for % protein, % calcium, % phosphorous and % moisture. Prepared ingredients such as mineral or protein supplements are generally furnished with an analysis provided by the vendor. Cereal grains and other farm grown bulk ingredients should, however, be analyzed by a qualified laboratory if accurately tailored rations are to be prepared. If ingredient analysis is impossible or impractical, book values based on average analyses for generic ration ingredients may be used, however, using generic analyses will not ensure maximum efficiency of an animal feed program.

Figure 9:
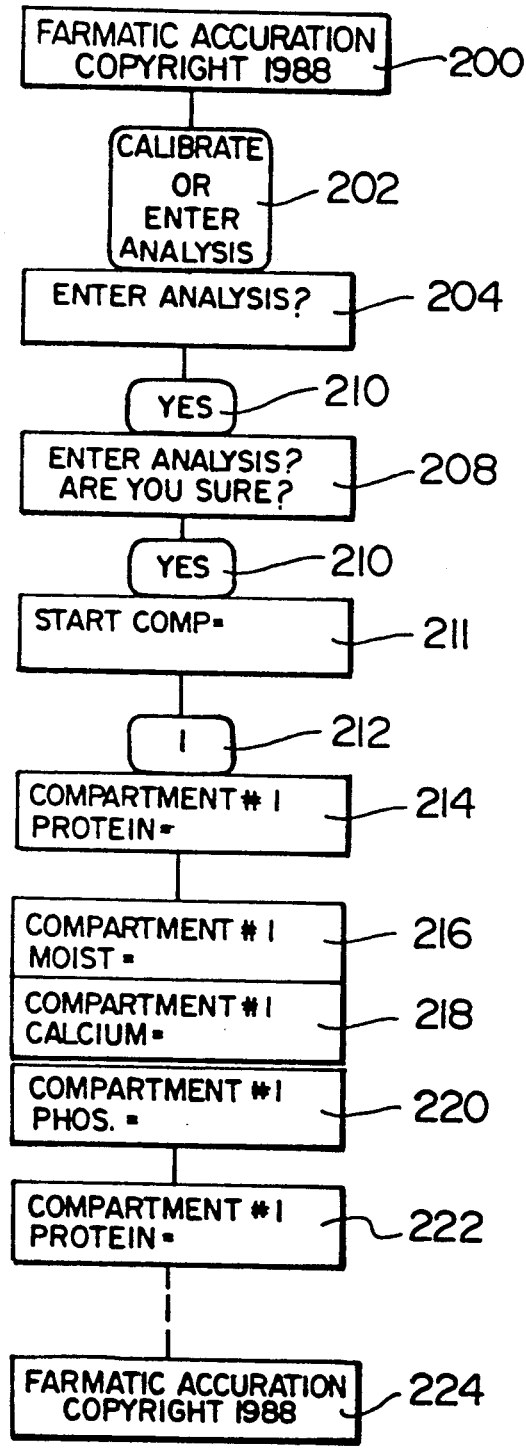
FIG. 9 is a process diagram for inputting a ration ingredient analysis using the console of FIG. 2; The elongated rectangles indicate LCD screen displays while the round cornered squares indicate key selections from the keypad shown in FIG. 8.

FIG. 9 illustrates the process of entering a ration ingredient analysis using keypad 44. The start up screen 200 that appears whenever the mill is powered up is illustrated at the top of FIG. 9. If the Calibrate or Enter Analysis key, 202 of FIG. 9, is pressed, the "Enter Analysis?" LCD screen display 204 is displayed. After verification that an analysis is to be entered, as shown in steps 206–210, the analysis for the ration ingredient of each proportioner compartment is entered sequentially beginning with any given compartment. A starting compartment number is supplied and the percent protein, calcium, phosphorous and moisture entered as requested, see steps 212–220. When the analysis of an ingredient supplied by a proportioner compartment is completely entered, the analysis for the next sequential ingredient compartment is requested. The process may be terminated at any time by pressing the "Start Over" key 276 (see FIG. 8).

A second step in preparing a precisely tailored animal feed ration is the calibration of the flow through each proportioner compartment 32. The process of mill calibration is illustrated in the process diagram of FIG. 10. From the start up screen 200, the "Calibrate or Enter Analysis" key 202 is selected. When the "Enter Analysis" screen 204 is displayed, the No key 226 is selected. A "Calibrate?" screen 220 is then displayed, to which the Yes key 210 is selected. All proportioner dial are then set at 20. This setting is arbitrary and will depend on the type of proportioner being used. The important factor is that the flow control setting of each proportioner compartment be as nearly equivalent as possible. Once the proportioner dial settings are equalized, the upper compartment back panel of the mill is removed and a test chute (not illustrated) is attached to each proportioner flow path. Each test chute is directed into a canister (not illustrated) for collecting the ration ingredient flowing from each proportioner auger. All six canisters are preferably identical in size and weight. The mill is then set into operation until a first of the six canisters is nearly full, at which time mill is stopped and each canister is weighed in turn. The respective weights are entered sequentially by compartment. While filling the canisters for the calibration of the mill, the half revolutions of each proportioner auger are counted and stored by the microprocessor 86 until the ingredient weight for each compartment have been entered by the operator. The control program divides the weight of each ingredient by the number of half revolutions of the respective proportioner auger to derive a weight per half revolution of each respective auger which is stored in EEPROM memory for future use in analysis and inventory computations.

Figure 10:
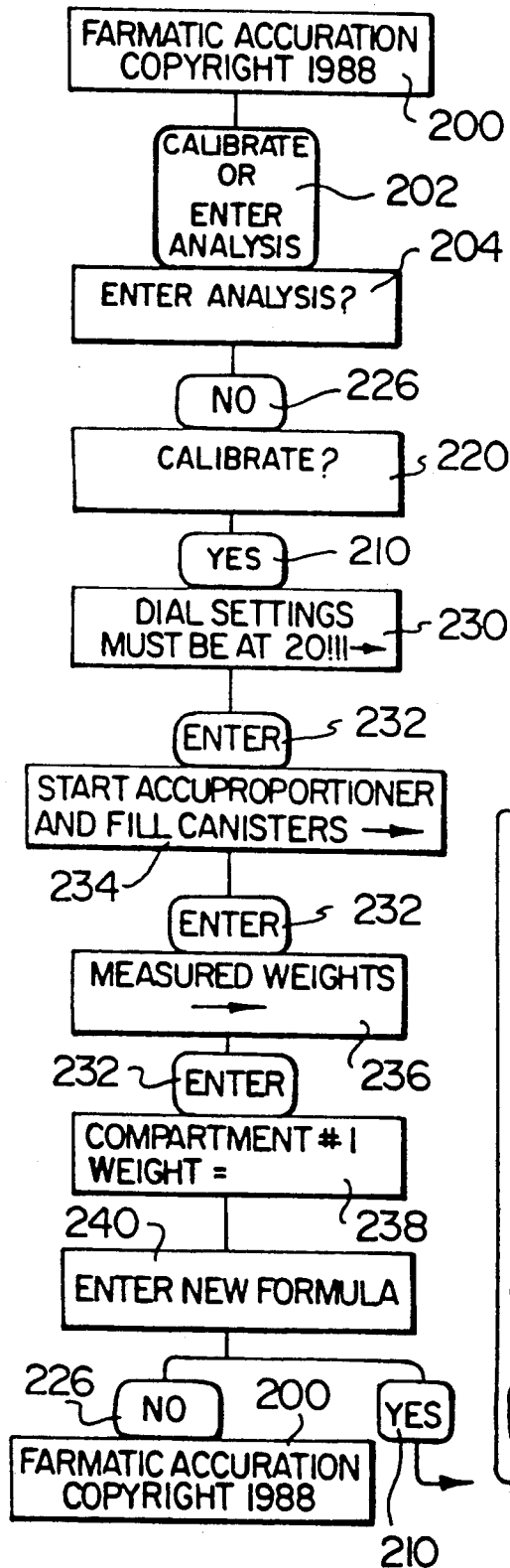
FIG. 10 is a process diagram illustrating the LCD displays and keypad selections for calibrating the proportioner of an animal feed mill equipped in accordance with the invention.

When the calibration of the mill's proportioner is completed, the user is presented with an option to enter a feed ration formula, LCD display 240 (FIG. 10). If the No key 226 is selected in response, the user is returned to the start up screen 200. If the Yes key 210 is selected, however, the user is passed directly to the loop illustrated at the bottom of FIG. 11. A new ration formula may likewise be input by first pressing the Calibrate or Enter Analysis key 202, skipping the Enter Analysis function by selecting the No key 226, skipping the Calibrate function by selecting the No key 226 again and selecting the Yes key 210 when the "Enter New Formula?", LCD display 242. A ration formula is entered by supplying the proportional weight per ton of each ingredient in a desired ration. A formula may contain 2 to 6 ingredients. A proportional weight per ton must be entered for each desired ingredient. Any proportioner compartments not used in a ration formula must be entered as zero.

Figure 11:
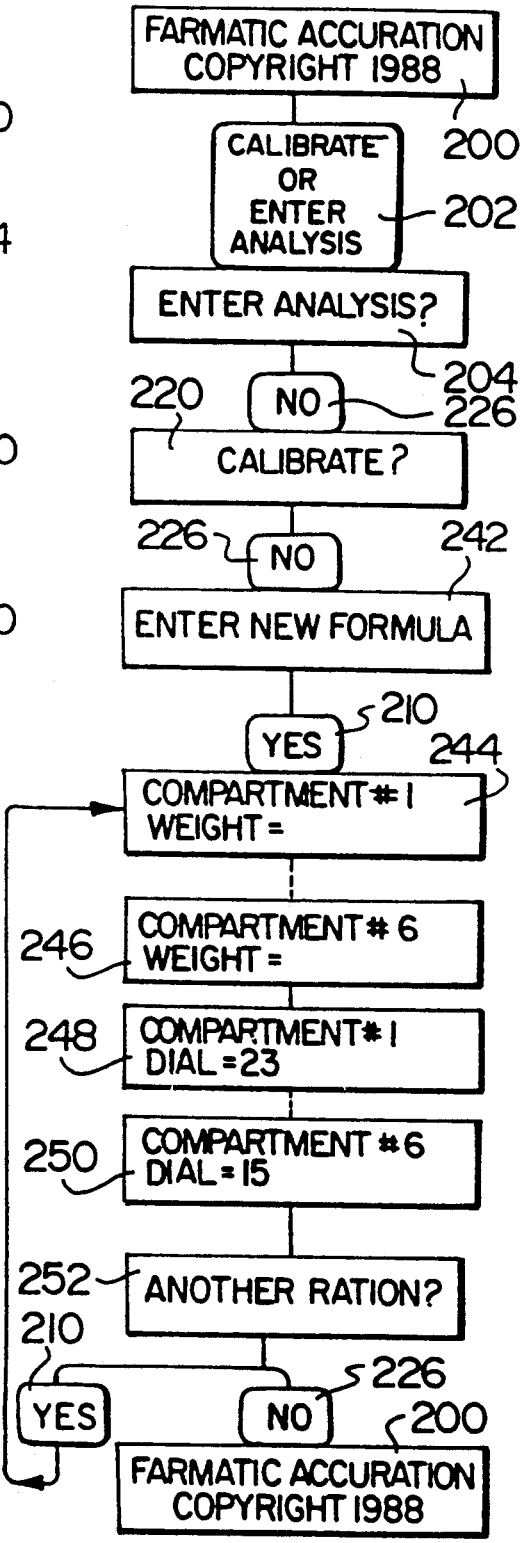
FIG. 11 is a process diagram of the LCD displays and keypad selections for entering a new animal feed formula using the console of FIG. 2.

As illustrated in FIG. 11, LCD displays 244-246 prompt the user for the proportional weight per ton of the ration ingredient in each proportioner compartment. When each of the requested weights is entered, the control program computes a dial setting for each proportioner flow control dial. The dial settings are displayed sequentially starting with compartment 1 and ending with compartment 6 as illustrated in FIG. 11, LCD displays 248-250. Proportioner dial settings must be manually recorded for future use if several ration formulas are used alternately in an animal feed program. Compartment dial settings are not stored in EEPROM memory as there is inadequate space to store that information. Once the dial settings for all six compartments have been displayed by microprocessor 86, the "Another Ration?", LCD display 252, is displayed. If the Yes key 210 is selected, the user is prompted with LCD display 244 to recommence the process for another ration formula. If the No key 226 is selected, the user is returned to the start up screen 200.

Whenever the mill is in operation, the flow rate through each ingredient compartment 32 can be monitored by selecting the "Inventory Control and Flow Rates" key 254 as illustrated in FIG. 12. If key 254 is selected, a first LCD display 256 requests whether ingredient flow rates are to be viewed. If the Yes key 210 is selected, the flow through compartment 1 is displayed as illustrated in LCD display 258. An Enter key 232 response will display the flow rate through the next compartment as shown in LCD displays 260 and 262. When the flow through each compartment has been observed, a subsequent Enter key 232 displays the "Inventory Control?" LCD display 264. If the No key 226 is selected, the user is returned to the start up screen 200. If the Yes key 210 is selected, the control program branches to LCD display 266 and displays the current usage inventory for each compartment as illustrated in LCD displays 266-270. The flow through each proportioner compartment is stored in EEPROM memory to track the usage of each ingredient. Up to 626 tons per compartment are tracked. When 626 tons of an ingredient have been processed, the usage register for that compartment is automatically reset to zero. Inventory usage data is extremely useful in tracking inventories and scheduling the reordering of ration ingredients. After the usage inventory data for the six compartments is displayed, a subsequent selection of the Enter key 232 prompts the control program to display "Reset Inventory?", LCD display 272. If the Yes key 210 is selected, a verification message is displayed, LCD display 274. If the Yes key 210 is again selected, all inventory registers are reset to zero.

To prepare an animal feed ration, the proportioner flow control dials are adjusted in accordance with the settings calculated by microprocessor 86 for a given formula, as described above, and the mill is started. At any time during the preparation of a ration, the analysis of the ration being prepared may be displayed on the LCD of console 40 by selecting one of the four analysis keys, 180-186 (FIG. 8) on the selection of an analysis key 180-186, the control program executes an instruction sequence which, summarily stated, performs the following:

(A) The revolutions of each proportioner auger are monitored for 12 or more seconds, depending on the operating capacity of the mill (slower mills are monitored longer) in a fashion previously described;

(B) The number of revolutions of each auger is multiplied by the weight per revolution of each ingredient, derived during the calibration of the proportioner and stored in EEPROM memory. The result of this computation yields the weight of each ingredient processed during the monitoring period;

(C) The proportional weight of each ingredient is computed using the result obtained from the computation of step B;

(D) The analysis of the ration is computed for a selected factor (protein, calcium, phosphorus or moisture), protein for example, by multiplying the proportional weight of each ingredient by the respective analysis of that ingredient, also stored in EEPROM memory as previously described, and adding the products to derive a computed analysis for the ration;

(E) The ration analysis is converted to a 90% dry basis by calculating the moisture content of the entire ration following the computations described above and converting the product to 90% dry using proportional mathematics.

(F) The analysis is displayed on the LCD (see FIG. 14).

Those skilled in the art will appreciate that a ration can therefore be fine tuned in an interactive online process by adjusting proportioner flow control dials and selecting analysis keys until an exactly tailored ration is achieved. Because the results of an adjustment of a proportioner flow control dial setting may generally be obtained within twelve seconds of the adjustment, rations are quickly and easily tailored to exact specifications and the greatest economy of animal feed rations is easily achieved.

It is thus apparent from the foregoing that a new and useful computerized monitoring system for assisting in the preparation of precisely tailored animal feed rations and efficiently monitoring inventories of ration ingredients has been disclosed.

Changes and modifications in the specifically described embodiments can be carried out without departing from the scope of the invention which is intended to be limited only by the scope of the appended claims.

The embodiments of the invention in which an exclusive property or privilege is claimed are defined as follows:

1. In combination, a computerized monitoring system and an animal ration processing mill, said combination comprising:
   at least two independently regulatable ration ingredient supply paths, each of said paths including an ingredient supply compartment, an auger for regulating the flow of an ingredient through said compartment, drive means for turning that auger and a variable speed control for that auger, wherein said ingredient supply compartment is connected on one end with a ration ingredient supply and on an opposite end with an input orifice of said mill, and each auger has opposed ends which are rotatably affixed to a given point on the opposite sides of said supply compartment and wherein the supply compartments are arranged in a parallel juxtaposed relation;
   means for simultaneously monitoring the flow through each of said at least two supply paths including a circuit board transverse to the one end of said augers and provided with a Hall Effect sensor adjacent said one end of each auger, one or more magnets attached to said one end of each auger so that each said magnet passes in proximity to said Hall Effect sensor with each revolution of the respective augers, and means for transmitting signals from said circuit board to said computing means;
   computing means provided with a control program for processing and storing in memory signals received from said monitoring means, calibrating the flow through said input paths, calculating flow control settings for said supply paths given a ration formula, and storing in a memory inventories of ration ingredient usage;
   a keypad for signal input to said computing means; and
   means for displaying outputs of said computing means.

2. A combination as in claim 1 further provided with a data communication port for transferring signals from said computing means to a second independent computer.

3. A combination as in claim 1 further provided with electrically erasable programmable read only memory for storing data through a power interruption.

4. A computerized monitoring system for an animal ration processing mill having at least two independently regulatable ration ingredient supply paths, each said supply path including an ingredient supply compartment which is connected on one end with a ration ingredient supply and on an opposite end with an input orifice of the mill, and further including an auger for regulating the flow of an ingredient through the compartment, and a mechanical drive with a variable speed control for turning the auger, said monitoring system comprising:
   a sensor for generating at least one sensor signal with each revolution of the auger;
   computing means including an input means for receiving the at least one sensor signal, a memory, a keypad for the input of signals from an operator, and a visual display means for the output of signals from the computing means;
   a control program executable on the computing means and including means for receiving from the keypad and storing in a memory an analysis of at least the percentage protein, calcium, phosphorous and moisture of the material supplied thorough each ingredient path; means for receiving from the keypad and storing in the memory the flow through each input path at a given flow control setting; means for calculating an appropriate flow control setting for each input path given a specific ration formula; and means for providing to an operator at any time during the formulation of a ration in response to a demand from the operator a dynamic display of the analysis of an animal ration being produced by receiving and processing the sensor signals to determine the rate of flow through each flow path and deriving from the analysis stored in the memory the estimated percentage of at least the protein, calcium, phosphorous and moisture of the ration in order to permit the operator to precisely adjust a ration by interacting with said computing means.

5. The computerized monitoring system as recited in claim 4 wherein the control program further includes the capacity to store in the memory an inventory for each supply path, which inventory is maintained current by subtracting the respective amount by weight of material moved through each said path during a given ration processing session.

6. A computerized monitoring system as in claim 5 wherein the output of the computing means further includes an estimated analysis for the percentage protein, percentage phosphorous and percentage calcium converted to a 90% dry feed basis.

7. A computerized monitoring system as recited in claim 4 wherein the sensor for generating at least one sensor signal with each revolution of the auger comprises:
   a circuit board transverse to the one ends of said augers and provided with a Hall Effect sensor adjacent said one end of each auger;
   one or more magnets attached to said one end of each auger so that each said magnet passes in proximity to said Hall Effect sensor with each revolution of the respective auger; and
   means for transmitting signals from the circuit board to the computing means.

8. A computerized monitoring system as in claim 4 wherein the visual display for the output of signals from the computing means comprises a liquid crystal display having two display lines of 20 characters each.

9. A computerized monitoring system as in claim 4 wherein the outputs of the computing means further includes an estimated analysis for the percentage protein, percentage phosphorous and percentage calcium converted to a 90% dry feed basis.

10. In combination, an animal ration processing mill of the type including a proportioner attachment and a computerized monitoring system, comprising:

a mill for processing an animal feed ration;

a proportioner attachment for the mill having at least two independently regulatable flow paths for supplying animal ration ingredients to the mill, each said flow path including an auger for regulating the flow of an ingredient thorough the compartment and a mechanical drive which includes a variable speed control for turning the auger;

a sensor for generating at least one sensor signal with each revolution of that auger;

computing means including an input means for receiving the sensor signal, a memory, a keypad for the input of signals from an operator and a visual display for the output of signals from the computing means; and a control program executable on the computing means and including means for receiving from the keypad and storing in the memory an analysis of at least the percentage protein, calcium, phosphorous and moisture of the material supplied thorough each ingredient path; means for receiving from the keypad and storing in the memory the flow through each input path at a given flow control setting; means for calculating an appropriate flow control setting for each input path given a specific ration formula; and means for providing to an operator at any time during the formulation of a ration in response to a demand from the operator a dynamic display of the estimated analysis of an animal ration being produced by receiving and processing the sensor signals to determine the rate of flow through each flow path and deriving from the analysis stored in the memory the estimated percentage of at least the protein, calcium, phosphorous and moisture of the ration in order to permit the operator to precisely adjust a ration by interaction with said computing means.

11. The combination as recited in claim 10 wherein the sensor for generating at least one sensor signal with each revolution of the auger comprises:

a circuit board transverse to the one ends of said augers and provided with a Hall Effect sensor adjacent each said one end of each auger;

one or more magnets attached to said one end of each auger so that each said magnet passes in proximity to the Hall Effect sensor with each revolution of the respective augers; and means for transmitting signals from said circuit board to said computing means.

12. The computerized monitoring system as recited in claim 11 wherein the supply paths comprise supply compartments which are arranged in a parallel juxtaposed relation and each auger has opposed ends which are rotatably affixed to a given point on the opposite side of each supply compartment.

13. A computerized monitoring system as recited in claim 10 wherein the visual display for the output of signals from the computing means comprises a liquid crystal display having two display lines and 20 characters each.

14. A computerized monitoring system as in claim 10 wherein the estimated analysis of each component further includes the display percentage being monitored converted to a 90% dry feed basis.

* * * * *